Figure 1:
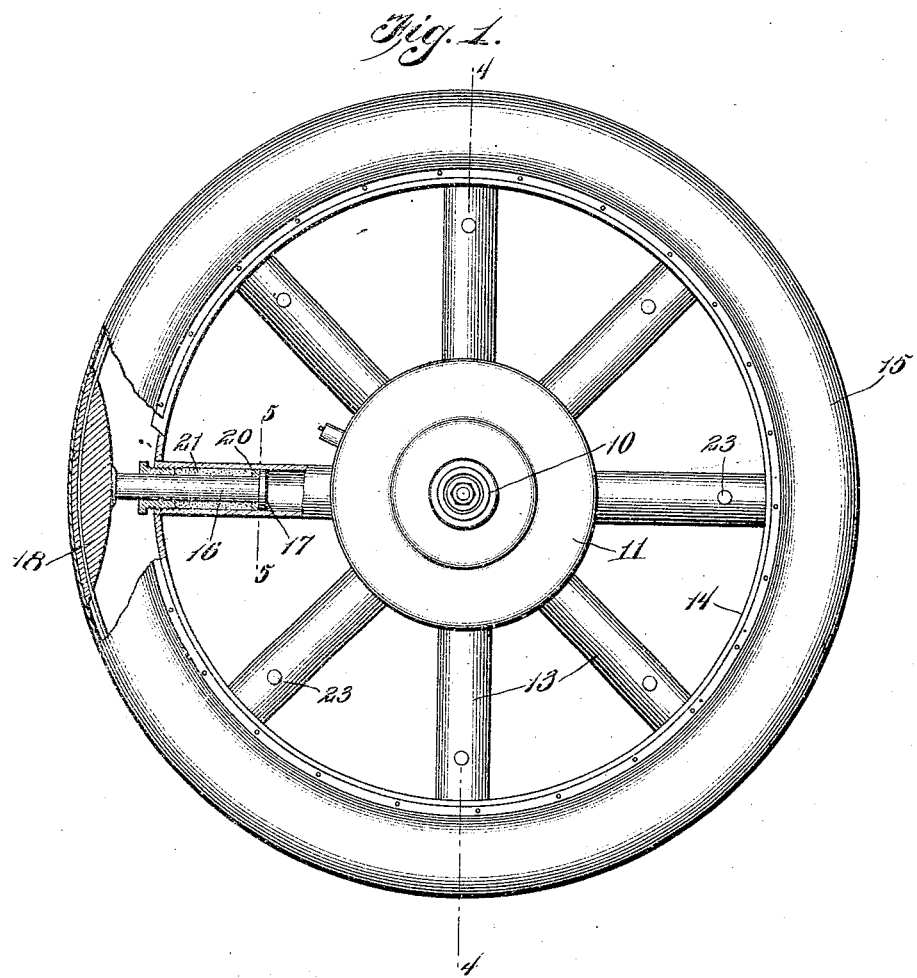

W. L. OLMSTEAD.
CUSHION WHEEL AND PUMP THEREFOR.
APPLICATION FILED DEC. 14, 1910.

1,067,439.

Patented July 15, 1913.
3 SHEETS—SHEET 1.

Witnesses

Inventor
William L. Olmstead

By Victor J. Evans
Attorney

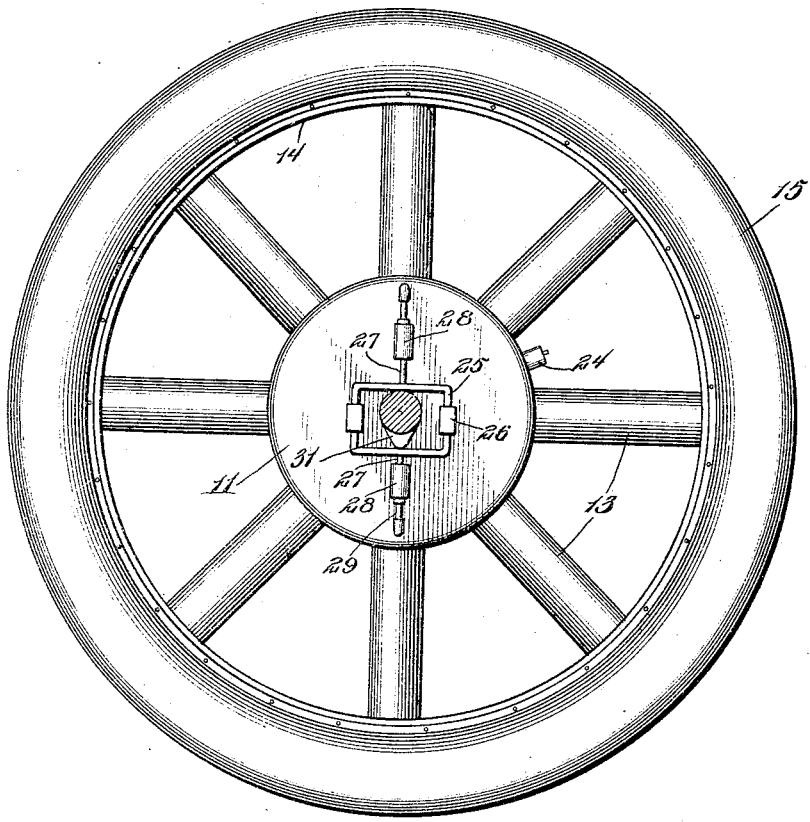

W. L. OLMSTEAD.
CUSHION WHEEL AND PUMP THEREFOR.
APPLICATION FILED DEC. 14, 1910.
1,067,439.
Patented July 15, 1913.
3 SHEETS—SHEET 3.
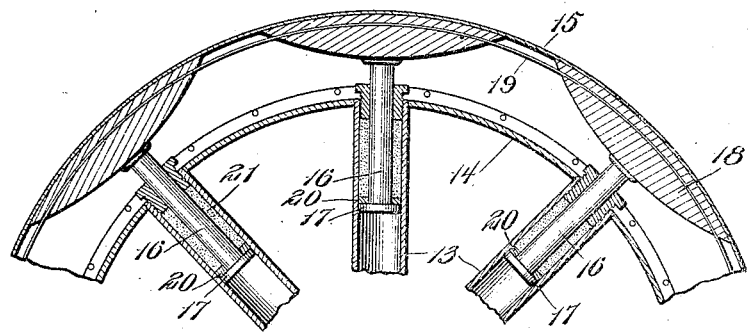
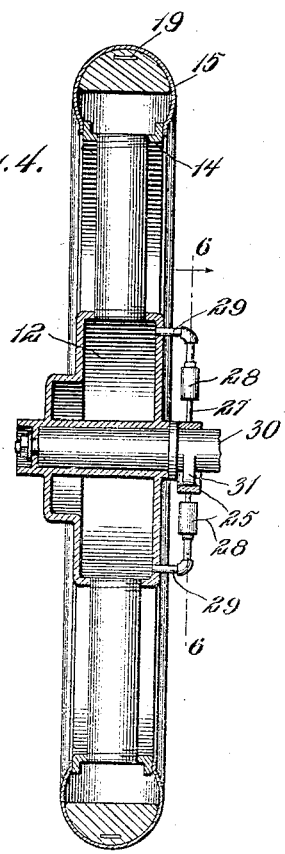
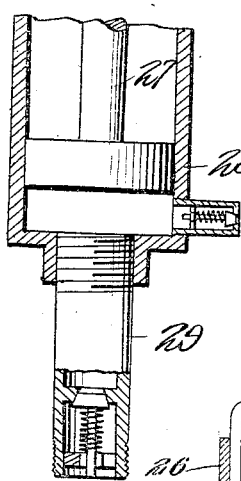
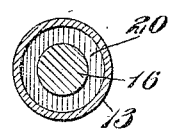
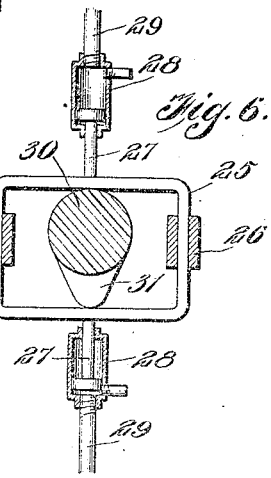
Witnesses
Inventor
William L. Olmstead
By Victor J. Evans
Attorney

UNITED STATES PATENT OFFICE.

WILLIAM L. OLMSTEAD, OF REDLANDS, CALIFORNIA.

CUSHION-WHEEL AND PUMP THEREFOR.

1,067,439.  Specification of Letters Patent. Patented July 15, 1913.

Application filed December 14, 1910. Serial No. 597,234.

*To all whom it may concern:*

Be it known that I, WILLIAM L. OLMSTEAD, a citizen of the United States, residing at Redlands, in the county of San Bernardino and State of California, have invented new and useful Improvements in Cushion-Wheels and Pumps Therefor, of which the following is a specification.

The invention relates to cushion wheels, and more particularly to the class of combined cushion wheels and automatically operated air pumps therefor.

The primary object of the invention is the provision of a wheel of this character in which all shocks, and jars incident to the travel of the wheel will be absorbed thereby, thus assuring the smooth travel of a vehicle.

Another object of the invention is the provision of a wheel in which the tire thereof is susceptible of yielding when traveling upon an uneven surface, thus obviating shocks and jars to a vehicle incident to the travel of the wheel upon the uneven surface, thereby increasing the life of the vehicle.

A further object of the invention is the provision of a wheel in which its tire will be yieldably supported for absorbing shocks and jars when traveling upon an uneven surface, the tire being held under air compression supplied to the wheel through the medium of a pump, the same being automatically operated on the revolving of the wheel.

A still further object of the invention is the provision of a wheel of this character which obviates the necessity of the employment of a rubber tire, yet possesses the requisite strength, yielding qualities and increases the durability thereof, thus giving the maximum life to the wheel.

A still further object of the invention is the provision of a wheel of this character which is simple in construction, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claim hereunto appended.

In the drawings: Figure 1 is a side elevation of a wheel constructed in accordance with the invention, the same being shown partly broken away. Fig. 2 is a similar view, looking toward the opposite or inner face of the wheel. Fig. 3 is a fragmentary vertical longitudinal sectional view through the wheel. Fig. 4 is a sectional view on the line 4—4 of Fig. 1. Fig. 5 is a sectional view on the line 5—5 of Fig. 1. Fig. 6 is a sectional view on the line 6—6 of Fig. 4. Fig. 7 is a fragmentary enlarged vertical longitudinal sectional view through one of the pump cylinders and its pipe connection, showing in detail the valve.

Similar reference characters indicate corresponding parts throughout the several views of the drawings.

Referring to the drawings by numerals, the wheel comprises a hub 10, the same being of the usual well-known construction, and formed from any suitable material, and is held fixed centrally within a hollow casing 11, the same forming a compressed air chamber 12, and from the said casing 11 project radial hollow spokes 13, the inner ends of the spokes being threaded into the casing 11 in any suitable manner, so as to form a fluid tight juncture therebetween. Fixed to the outer end of the spokes 13 is a rim 14, the same being of any desirable construction, and the outer ends of the spokes 13 are threaded in the said rim 14, so as to form a fluid tight juncture therebetween. These spokes 13 are preferably constructed from metal, although the same may be formed from any other suitable material, and also reinforced, if the occasion should require.

Connected to the rim 14 is a flexible tire 15, the same being preferably constructed from canvas or leather, although it may be constructed from other suitable material. This tire 15 is suitably connected with the rim 14, whereby the same may be readily and easily detached when desired. Working within the spokes 13 are plungers 16, the inner ends of which are provided with piston heads 17, while their outer ends have detachably connected thereto presser heads or feet 18, the latter working against the inner face of the tread portion of the tire 15, and passed through these heads or feet 18, is a flexible steel band 19, the latter extending entirely about the rim between it and the tread portion of the tire 15, and within the latter.

Secured within the spokes 13 medially of their length are centering rings 20, with which abut the piston heads 17 when the plungers 16 are forced outwardly by the presence of compressed air within the air chamber 12 formed by the casing 11 surrounding the hub of the wheel. Surrounding each plunger 16 is a packing 21 which is held compressed between the centering rings 20 and the rim 14 by means of an adjustable packing gland 22, the same being suitably threaded in the outer end of the hollow spokes 13 and surrounds the said plungers 16, so that the latter will work therethrough.

Mounted in the spokes 13 at spaced intervals, circumferentially of the same, are suitable oil cups 23, which latter permit the feeding of oil into the said spokes 13 for lubricating the piston heads 17 of the plungers 16 working within the spokes.

Suitably mounted in the casing 11 is an automatic air exhaust valve 24, thus permitting the exhaust of excess compressed air from the air chamber 12 during the working of the wheel.

Connected with the inner end of the hub is an automatic air pressure pump which comprises a yoke or frame 25, the same being slidably fitted in guide members 26, and from diametrically opposite points of this frame 25 and secured thereto are pistons 27, the same working in pump cylinders 28 suitably fixed exteriorly to the casing 11, the pump cylinders 28 being in communication with the air chamber 12 by means of pipes 29, so that air from the pump cylinders 28 may be delivered directly into said air chamber 12, whence it will act upon the piston heads 17, thus forcing outwardly the plungers 16, thereby holding the tire 15 distended for use.

Formed on the axle 30, upon which the hub 10 of the wheel revolves, is a cam 31, which operates alternately upon opposite ends of the yoke or frame 25 upon the revolution of the wheel, thereby reciprocating the pistons 27 in the pump cylinders 28 for compressing air into the air chamber 12 within the hollow casing 11 of the wheel, thus the tire 15 of the wheel will be sustained distended for use during the continuity of revolution of the wheel.

In practice it is to be understood that the chamber 12 at each air intake through the pipe 29 will be provided with a suitable check valve and also that each pump cylinder will be provided with a suitable valve such as are disclosed in the Swiss Patent, #22,051, of 1901. The check valve employed in each pump cylinder will automatically close on the compression stroke of the piston 27, so as to prevent the escape of air from the cylinder 28, thereby forcing the air into the chamber 12. The check valves arranged therein will open to permit the ingress of air, but on the reverse stroke will close to prevent the escape of air therefrom.

From the foregoing, it is thought that the construction and operation of the invention will be clear and apparent, and therefore, a more extended explanation has been omitted.

It is to be understood that the invention is not restricted to the disclosure herein, because changes, variations, and modifications are contemplated in the structure, such as come properly within the scope of the appended claim, without departing from the spirit of the invention, or sacrificing any of its advantages.

What is claimed is:

The combination with a stationary axle, of a vehicle wheel having a hollow hub rotatably mounted on the axle, guide members fixed to and projecting outwardly from said hub at opposite sides of the axle, a rectangular shaped frame slidably engaged in said guide members and surrounding the axle, pipes engaged in the head for communication therewith and having elbows arranged in alinement with each other, pump cylinders disposed exteriorly of the frame at one side of the hub and carried by the elbow, diametrically opposed piston rods fixed to the frame and having piston heads working within the pump cylinder and a cam formed on the axle and alternately engageable with opposite sides of the frame for reciprocating the latter.

In testimony whereof I affix my signature in presence of two witnesses.

WILLIAM L. OLMSTEAD.

Witnesses:
C. E. IVESON,
J. M. CLEVELAND.